Aug. 25, 1925.
F. A. VOLLBRECHT
1,551,183
ELECTRIC TOASTER
Filed June 26, 1924
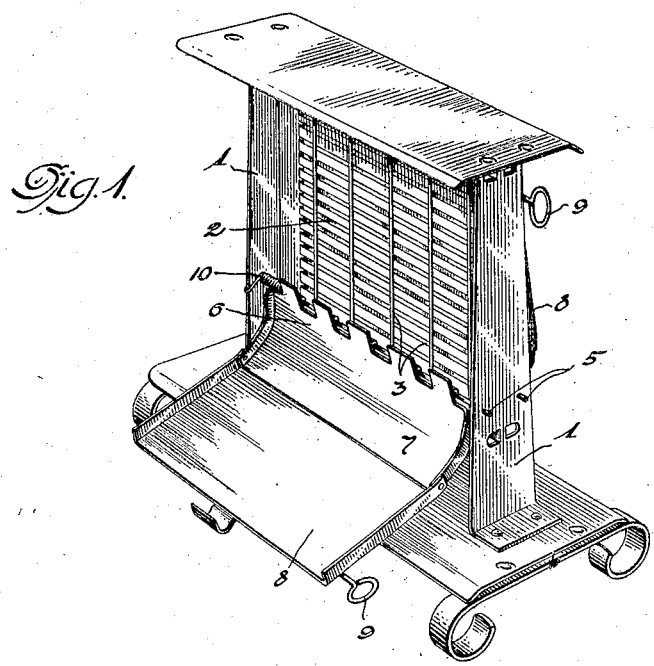
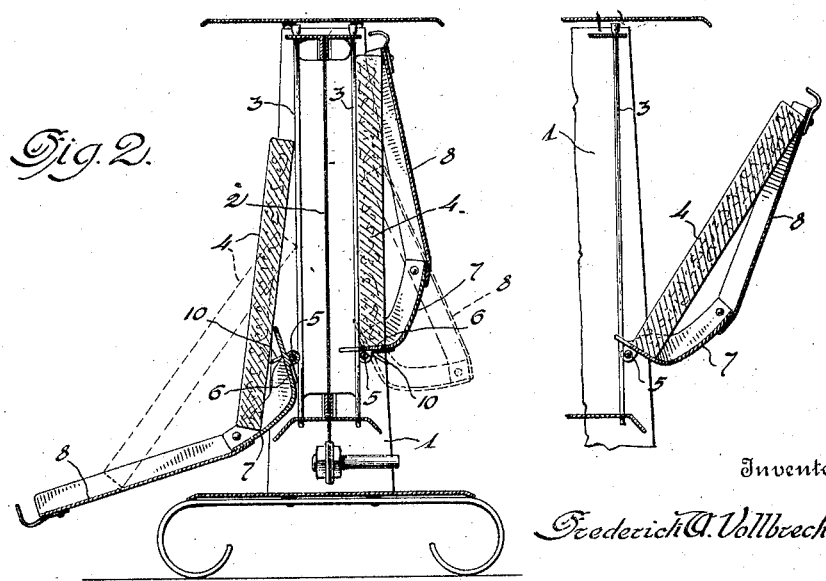

Patented Aug. 25, 1925.

1,551,183

UNITED STATES PATENT OFFICE.

FREDERICK A. VOLLBRECHT, OF WAYNE, MICHIGAN.

ELECTRIC TOASTER.

Application filed June 26, 1924. Serial No. 722,468.

*To all whom it may concern:*

Be it known that I, FREDERICK A. VOLL-BRECHT, a citizen of the United States, residing at Wayne, in the county of Wayne and State of Michigan, have invented certain new and useful Improvements in Electric Toasters, of which the following is a specification, reference being had therein to the accompanying drawings.

This invention has reference to electric toasters more particularly those of the vertical type wherein an upright heating element is adapted to the disposal of slices of bread to be toasted on one or both sides thereof, said bread being supported by a platform in a required relation to the heating element and enclosed on the other side by suitable means to prevent the inadvertent displacement of the bread whilst being toasted and also in some cases to effect the conservation of heat about the said bread.

Hitherto in such a device the enclosing means have been adapted to movement from their operative position usually by an outward and downward swing thereof about a pivot at the lower or platform end of the same to admit of access to the bread in order that it may be reversed for the toasting of the opposite side thereof. This method of reversal has been found to be objectionable mainly due to the heated nature of the bread and its proximity to the hot element often causing burning of the fingers or discomfort to the user and being also objectionable to some extent on account of the amount of handling required.

In order to overcome this it has been suggested to provide in such a toaster a tray adapted to swing downwardly to an extent sufficient to allow the bread to slide outwardly thereon, and also means moving the lower edge of the bread in order to bring it substantially beyond the center of gravity thereof to facilitate said sliding, the tray being operated by a turning rod at the lower end of the tray. In such devices the bread is relieved from all support except at the lower edge thereof immediately the movement of the tray is commenced so that the bread is liable to fall from its position in an undesirable manner either defeating the intended purpose or necessitating its adjustment prior to being brought again into toasting position.

The overcoming of such disadvantages is one of the main objects of this invention as well as the provision of an efficiently operable device for the carrying out of the turning of bread in the toaster in the desired manner.

A further object is to provide for the facility of the initial movement of the bread when turned by effecting its sliding down an acutely inclined plane relative to the tray and its reception thereby in a more moderately inclined or approximately horizontal position; and still further objects are for the maintaining of contact between said enclosure and the rear surface of the bread during a substantial part of the operation of the turning device, and to effect the operation of this platform and tray by the depressing of means at the upper end of the said tray.

An important object of the said invention is to provide in a toaster of the type referred to an arrangement of parts which may be operated in a modified manner to permit of the bread being swung outwardly whereby the face thereof may be examined to ascertain whether it is sufficiently toasted to warrant being turned by the normal operation of the mechanism.

Still further objects subsidiary to or resulting from the aforesaid objects, or from the construction or operation of the invention as it may be carried into effect, will become apparent as the said invention is hereinafter further disclosed.

In carrying the said invention into effect I may provide in a toaster having an upright element and a frame a bread receiving and positioning member comprising upper and lower parts hingedly connected together, the upper part being in the form of a rack or tray and the lower part a pivoted platform having a marginal portion operably engaging said tray in a closing direction, a spring yieldingly maintaining said member in a raised or closed position, and a handle adapted by depression to effect the lowering of said tray and the outward swinging of said platform followed by the outward swinging of the tray to an open position, said platform presenting a surface to the lower edge of the bread in an acutely inclined plane relative to the tray when lowered.

The said handle is also adapted to be operated outwardly of the toaster whereby the face of the bread may be examined. All of which is more particularly described and ascertained hereinafter, by way of example, having reference to the accompanying drawing, wherein:—

Figure 1 is a perspective view of a toaster embodying the said invention, and

Figure 2 is a vertical transverse section of the same on a slightly larger scale.

Figure 3 is a detail transverse sectional view of the device during the operation of lowering the tray to permit inspection of the toast.

Similar characters of reference indicate similar parts in the several figures of the drawing.

1 is the frame and 2 the heating element of a toaster of the vertical type, 3 being a grid extending over the element and determining the spacing of bread 4 from the said heating element. The normal toasting position is indicated on the right hand side of Figure 2 of the drawing.

Extending across each side of the frame and at the lower end of heating element is a rod 5 upon which is pivotally mounted a platform 6 forming in its normal or closed position a rest for the lower edge of the bread being toasted, and this platform is provided with an upwardly extending outer marginal portion 7 to which is hingedly connected a tray 8. The marginal portion 7 and the adjacent edge of the tray 8 overlap so that the said tray is limited in its outward swinging movement with respect to the said portion 7.

In the normal or operative position of the tray shown on the right hand side of the said Figure 2 the upper edge of the tray rests against the upper outer face of the bread 4 and retains it in its toasting position, and this upper part of the tray is provided with a handle or lever 9, pressure upon which will effect the lowering of the said tray, whilst still in contact with the bread, to the position shown in dotted lines in the said figure, the platform being tilted outwardly and downwardly as shown, against the resistance of a spring 10, carried by the rod 5 and engaging the frame and the underside of the said platform. It is this spring which, in this example, raises and maintains raised the platform and tray in their closed positions.

The said tray is then swung outwardly and downwardly to the position shown on the left hand side of the said figure, the bread first sliding down the marginal portion 7 of the platform 6 as indicated in full lines, and then down and on to the comparatively horizontal tray 8, so that upon the release of the said tray and its return to the closed position by the action of the said spring, through the medium of the platform, the toast is returned to the grid 3 in a reverse position to that which it previously occupied.

If, however, the said handle in its initial movement be pulled outwardly away from the heating element so that the tray 8 and platform 6 are moved as one, in the manner indicated in Figure 3, the bread will swing with the said tray and thereby expose its face for examination as shown, following which the parts may be returned to their normal position and then operated in the manner described for the turning of the bread if it be necessary or desirable.

The operation of the tray is thus essentially different to the swinging trays heretofore referred to and ensures a ready and dependable reversal of the bread at each operation without danger of burning the fingers or requiring handling of bread. Furthermore, at no stage in the operation is the bread in such a position unsupported that it is liable to fall over on its lower edge instead of sliding in the required manner, except when the device is specifically operated for that purpose in the manner explained.

This invention may be developed within the scope of the following claims without departing from the salient features of the said invention and it is desired that the specification and drawing be read as being merely illustrative and not in a limiting sense except as necessitated by the prior art.

What I claim is:—

1. In a toaster, a frame, a vertical heating element therein, an outwardly swingable platform mounted in said frame at the lower part of said heating element, said platform having an upwardly extended outer marginal portion, a tray hingedly connected to said marginal portion and movable thereby to an upright position adjacent the upper part of said element, and a spring yieldingly effecting the raising of said tray.

2. In a toaster, a frame, a vertical heating element therein, an outwardly swingable platform mounted in said frame at the lower part of said heating element, said platform having an upwardly extended outer marginal portion, a tray hinged to said marginal portion and movable therewith to an outward downwardly inclined position.

3. In a toaster, a frame, a vertical heating element therein, an outwardly swingable platform mounted in said frame at the lower part of said heating element, said platform having an upwardly extended outer marginal portion, a tray hinged to said marginal portion and movable therewith to an outward downwardly inclined position, said platform being swingable independent of the outward swinging of said tray.

4. In a toaster, a frame, a vertical heating element therein, an outwardly swingable platform mounted in said frame at the lower part of said heating element, said platform having an upwardly extended outer marginal portion, a tray hinged to said marginal portion and movable therewith to an outward downwardly inclined position, said marginal portion having a greater inclination than said tray when in its lowered position.

5. In a toaster, a frame, a vertical heating element therein, an outwardly swingable platform mounted in said frame at the lower part of said heating element, said platform having an upwardly extended marginal portion, a tray hinged to said marginal portion and movable therewith to an outward downwardly inclined position, a spring yieldingly retaining said platform and tray in a raised position.

6. In a toaster, a frame, a vertical heating element therein, an outwardly swingable platform mounted in said frame at the lower part of said heating element, said platform having an upwardly extended outer marginal portion, a tray hinged to said marginal portion and movable therewith to an outward downwardly inclined position, means on said marginal portion limiting the outward swinging of said tray with respect thereto, and a spring yieldingly effecting the raising of said tray through the medium of said platform and said limiting means.

7. In a toaster, a frame, a vertical heating element therein, an outwardly swingable platform mounted in said frame at the lower part of said heating element, said platform having an upwardly extended outer marginal portion, a tray hingedly connected to said marginal portion and movable thereby to an upright position adjacent the upper part of said element, a spring yieldingly rotating said part in a raised position, and actuating means at the upper end of said tray.

8. In a toaster, a frame, a vertical heating element therein, an outwardly swingable platform mounted in said frame at the lower part of said heating element, said platform having an upwardly extended outer marginal portion, a tray hingedly connected to said marginal portion and movable thereby to an upright position adjacent the upper part of said element, a spring yieldingly rotating said part in a raised position, and actuating means adapted for effecting the operation of said tray by depression.

9. In a toaster, a frame, a vertical heating element therein, an outwardly swingable platform mounted in said frame at the lower part of said heating element, said platform having an upwardly extended outer marginal portion, a tray hinged to said marginal portion and movable therewith to an outward downwardly inclined position, and actuating means adapted for effecting the operation of said tray by depression.

10. In a toaster, a frame, a vertical heating element therein, an outwardly swingable platform mounted in said frame at the lower part of said heating element, said platform having an upwardly extended marginal portion, a tray hinged to said marginal portion and movable therewith to an outward downwardly inclined position, a spring yieldingly retaining said platform and tray in a raised position, and means facilitating the swinging of said tray.

11. In a toaster, a frame, a vertical heating element therein, an outwardly swingable platform mounted in said frame at the lower part of said heating element, said platform having an upwardly extended outer marginal portion, a tray hinged to and independently swingable inwardly of said marginal portion.

12. In a device of the class described, a frame, and a bread holder mounted in said frame, said bread holder being hinged to said frame and also divided and hinged intermediate of its length whereby the upper part of said holder is swingable with respect to the lower part thereof.

13. In a device of the class described, a frame, and a bread carrier swingably mounted at its lower end in said frame, said carrier being foldable intermediate of its length whereby the lower part of said carrier is swingable either with or independent of the upper part thereof.

In testimony whereof I affix my signature.

FREDERICK A. VOLLBRECHT.